United States Patent [19]
Muffoletto et al.

[11] Patent Number: 5,624,767
[45] Date of Patent: Apr. 29, 1997

[54] ALKALI METAL CELL HAVING MAIN AND ALTERNATE ELECTRODES

[75] Inventors: Barry C. Muffoletto, Alden; Neal N. Nesselbeck, Lockport; Rodney E. Stringham, Corfu, all of N.Y.

[73] Assignee: Wilson Greatbatch Ltd., Clarence, N.Y.

[21] Appl. No.: 472,811

[22] Filed: Jun. 7, 1995

[51] Int. Cl.$^6$ .......................... H01M 14/00; H01M 12/00
[52] U.S. Cl. .................................. 429/7; 429/9; 429/105; 429/150; 429/178; 429/209
[58] Field of Search ........................ 429/9, 7, 101, 429/105, 209, 150, 178, 61

[56] References Cited

U.S. PATENT DOCUMENTS 5,183,712  2/1993  Beldock et al. ............................ 429/9

*Primary Examiner*—John S. Maples
*Attorney, Agent, or Firm*—Hodgson, Russ, Andrews, Woods & Goodyear LLP

[57] ABSTRACT

An electrochemical cell including an alkali metal anode and a cathode, one of the anode or cathode being connected to a structure for making electrical connection from a load to the cell, the other of the anode or cathode having main and alternate portions, a main terminal connected to the main anode or cathode portion for making electrical connection between a load and the cell, and an alternate terminal connected to the alternate anode or cathode portion for making electrical connection between a load and the cell, so that the main anode or cathode portion first is discharged with the alternate portion held in reserve, whereupon when the main portion reaches end of life the alternate anode or cathode portion is discharged. The main and alternate anode or cathode portions are insulated from each other, and the anode preferably is of lithium. There is also provided a voltage responsive switch means in combination with the cell and connected electrically between a load and the main and alternate terminals for connecting the main terminal initially to the load and then disconnecting the main terminal and connecting the alternate terminal to the load when the main portion reaches end of life. The cell can be provided with a casing of electrically conductive material with one of the anode or cathode being connected to the casing for making electrical connection to the load through the casing.

25 Claims, 3 Drawing Sheets

ALKALI METAL CELL HAVING MAIN AND ALTERNATE ELECTRODES

BACKGROUND OF THE INVENTION

This invention relates to the art of electrochemical cells, and more particularly to a new and improved alkali metal cell having end of life indication.

Electrochemical cells having high energy density and current delivery capability have been developed for use with implantable medical devices. In particular, alkali metal/solid cathode and alkali metal/oxyhalide cells have been developed wherein the anode typically is lithium and the electrolyte is either solid or liquid. In addition, it has been found to be advantageous to provide a casing of conductive material in operative contact with either the anode or cathode to provide, respectively, a case negative or case positive configuration.

When electrochemical cells are used with implantable medical devices, it is important to provide a warning indication toward the end of discharge of the cell signalling an approaching end-of-life of the cell so that appropriate measures can be taken for cell replacement. Typically this is accomplished by a detectable step or transition occurring in the output voltage of the cell which serves as an indication of cell end-of-life. In the design of such an electrochemical cell it would be highly desirable to provide a relatively larger interval between the onset of end-of-life of the cell and the time when replacement of the cell is needed.

SUMMARY OF THE INVENTION

It is, therefore, a primary object of this invention to provide a new and improved end-of-life indication for alkali metal/solid cathode cells and for alkali metal/oxyhalide cells.

It is a further object of this invention to provide such an end-of-life indication for alkali metal cells having a relatively larger interval between the onset of end-of-life of the cell and the time when replacement of the cell is needed.

It is a further object of this invention to provide such an end-of-life indication in a cell having a case negative or a case positive configuration.

It is a more particular object of this invention to provide such a cell having an alkali metal anode and including either a halogen cathode and solid electrolyte, a solid cathode and liquid electrolyte or a soluble cathode.

The present invention provides an electrochemical cell including an alkali metal anode and a cathode, one of the anode or cathode being operatively connected to means for making electrical connection from a load to the cell, the other of the anode or cathode having main and alternate portions, main terminal means operatively connected to the main anode or cathode portion for making electrical connection between a load and the cell, and alternate terminal means operatively connected to the alternate anode or cathode portion for making electrical connection between a load and the cell, so that the main anode or cathode portion first is discharged with the alternate portion held in reserve, whereupon when the main portion reaches end of life the alternate anode or cathode portion is discharged. The main and alternate anode or cathode portions are insulated from each other, and the anode preferably is of lithium. There is also provided switching means in combination with the cell and connected electrically between a load and the main and alternate terminal means for connecting the main terminal means initially to the load and then disconnecting the main terminal means and connecting the alternate terminal means to the load when the main portion reaches end of life. The cell can be provided with a casing of electrically conductive material with one of the anode or cathode being operatively connected to the casing for making electrical connection to the load by means of the casing. The present invention is applicable to an electrochemical cell including an alkali metal anode, a halogen cathode and a solid electrolyte, to a cell including an alkali metal anode, a solid cathode and a liquid electrolyte and to a cell including an alkali metal anode and a soluble cathode.

The foregoing and additional advantages and characterizing features of the present invention will become clearly apparent upon a reading of the ensuing detailed description together with the included drawing wherein:

BRIEF DESCRIPTION OF THE DRAWING FIGURES

DETAILED DESCRIPTION OF THE ILLUSTRATED EMBODIMENT

Figure 1:
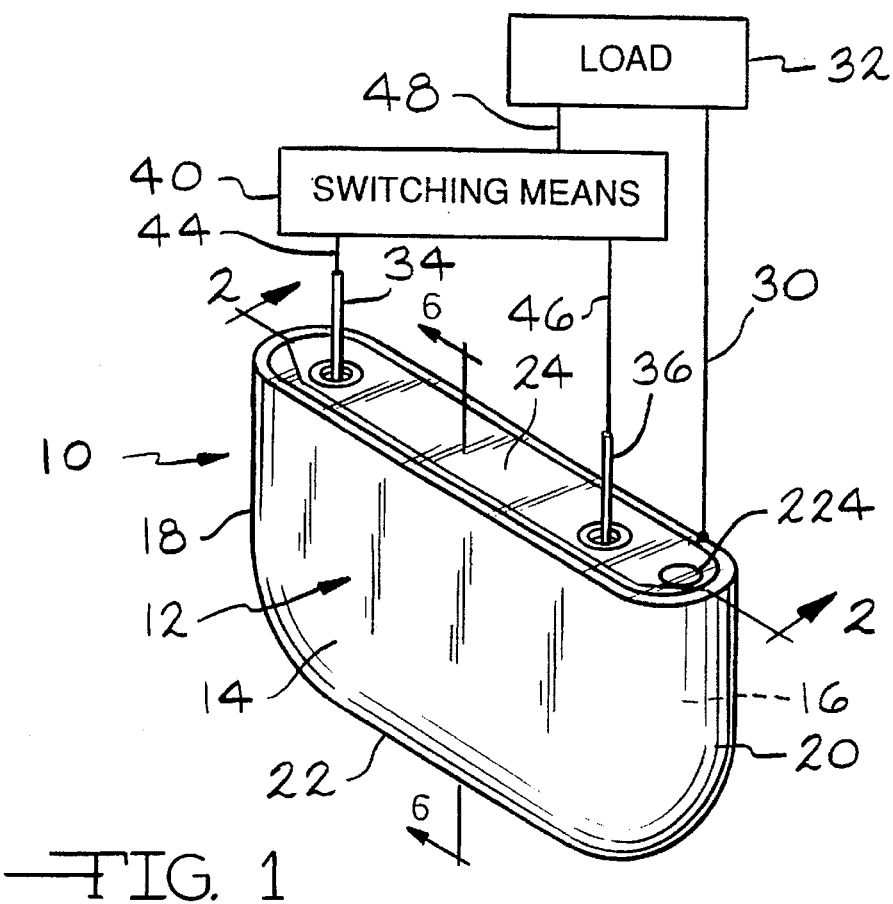
FIG. 1 is a perspective view, partly diagrammatic, of an electrochemical cell including main and alternate electrodes according to the present invention.

Referring now to FIG. 1 there is shown an alkali metal/solid cathode electrochemical cell generally designated 10 provided with an improved end-of-life indication according to the present invention. The cell components are contained within a casing 12 of metal such as stainless steel including spaced apart sidewalls 14, 16 joined by curved end walls 18, 20 and a curved bottom wall 22. The open top of casing 12 is closed by a lid 24.

The improved end-of-life indication can be used with alkali metal/solid cathode or alkali metal/oxyhalide electrochemical cells of both solid cathode and liquid electrolyte types. In the solid cathode type, for example a lithium solid cathode cell, a solid cathode material such as silver vanadium oxide, carbon monofluoride or manganese dioxide is contained within casing 12 and surrounded by a separator. A lithium anode also is within the casing. External electrical connection is provided by lead means extending from within casing 12 in a manner which will be described and by a contact region comprising lid 24 or the entire conductive casing 12 which is insulated electrically from the aforementioned lead means which also will be described. In the liquid cathode/electrolyte type, for example a lithium oxyhalide cell, electrolyte fills the casing interior and is in operative contact with the anode and with a cathode element comprising a carbon body having a cathode current collector embedded therein. A separator is employed between the anode and the carbon cathode. External electrical connection is provided in a manner similar to that described hereinabove. For a more detailed description of such a liquid electrolyte cell, reference may be made to U.S. Pat. No. 4,440,453 issued Jan. 20, 1981 entitled "High Energy Density Battery System" and assigned to the assignee of the present invention, the disclosure of which is hereby incorporated by reference.

The electrochemical cell of the present invention includes an alkali metal anode and a cathode within casing 12, one of the anode or cathode is operatively connected to means such as conductive casing 12 for making electrical connection via conductor 30 from a load 32 to the cell, and the other of the anode or cathode having main and alternate portions according to the present invention. There is provided main terminal means 34 operatively connected to the main anode or cathode portion for making electrical connection between the load 32 and the cell, and alternate terminal means 36 operatively connected to the alternate anode or cathode portion for making electrical connection between the load 32 and the cell. As a result, the main anode or cathode portion first is discharged with the alternate portion held in reserve, whereupon when the main portion reaches end-of-life the alternate anode or cathode portion is discharged. The present invention also provides switching means generally designated 40 in combination with the cell and connected electrically between the load 32 and the main and alternate terminal means 34 and 36 for connecting the main terminal means 34 initially to the load 32 and then disconnecting the main terminal means and connecting the alternate terminal means 36 to the load when the main portion reaches end-of-life. The end-of-life indication according to the present invention advantageously provides a relatively longer interval between the onset of end-of-life of the cell and the time when replacement of the cell is needed. As shown in FIG. 1, the main and alternate terminal means 34 and 36, respectively, are connected by conductors 44 and 46, respectively, to inputs of switching means 40. The output of switching means 40 is connected by conductor 48 to load 32. The main and alternate anode or cathode portions are insulated from each other as will be described, and the anode preferably is of lithium. The end-of-life indication provided by the present invention is applicable to an electrochemical cell including an alkali metal anode, a halogen cathode and a solid electrolyte, to a cell including an alkali metal anode, a solid cathode and a liquid electrolyte and to a cell including an alkali metal anode and a soluble cathode.

Figure 2:
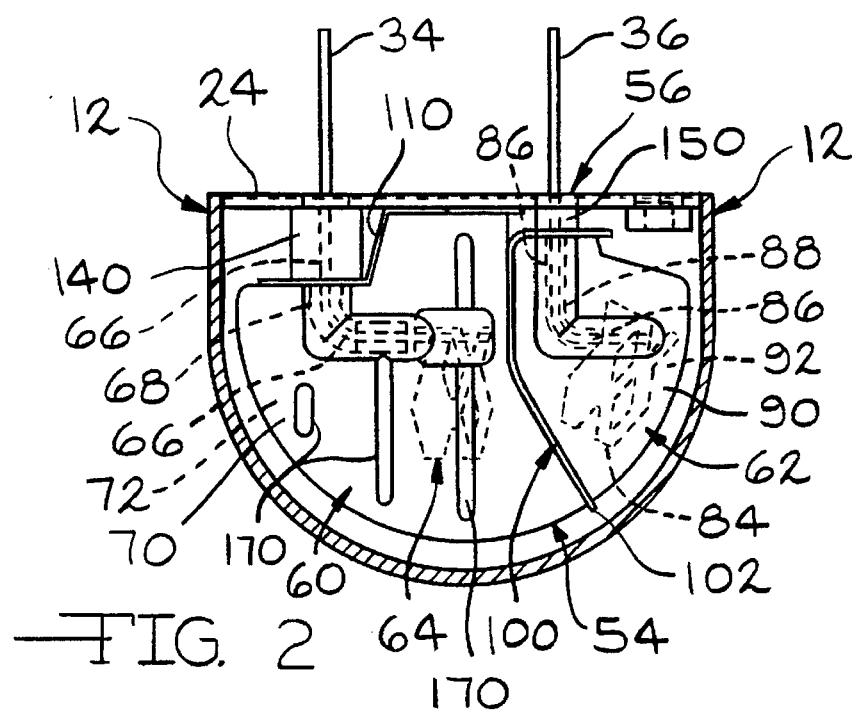
FIG. 2 is sectional view taken about on line 2—2 in FIG. 1.

Referring now to FIG. 2, the cell according to this embodiment of the present invention is of the liquid electrolyte type including an alkali metal anode and a solid cathode. As will be shown and described in detail, the cell of the illustrated embodiment includes within casing 12 a centrally-located anode assembly with cathode parts on opposite sides of the anode assembly, separators therebetween and liquid electrolyte filling the casing. There is shown in FIG. 2 an anode sub-assembly 54 and a header sub-assembly 56. Referring first to the anode sub-assembly, in accordance with the present invention the anode of the cell includes a main portion 60 and an alternate portion 62. The anode portions are connected to separate terminals and are insulated from each other. Each anode portion comprises a pair of lithium plates or slabs bonded together and against an anode current collector in a sandwich-like arrangement which is well-known to those skilled in the art. The size and in particular the surface area of main anode portion 60 is greater than that of alternate anode portion 62. In particular, main anode portion 60 has a central current collector element 64 of metal such as nickel mesh which is connected by a metal conductor 66 to main terminal means 34. Preferably, the terminal 34 and conductor 66 can be portions of a single integral wire conductor. An insulator sleeve 68 of suitable material such as Tetzel surrounds conductor 66. A pair of lithium plates or slabs 70 and 72 are provided on opposite sides of current collector 64 in a sandwich-like arrangement. The lithium anode elements 70, 72 are pressure bonded to the current collector 64 in a manner well known to those skilled in the art, this being facilitated by the mesh formation of current collector 64 in a known manner. As a result, contact between the lithium plates and the current collector 64 is maximized by the bonded structure. In addition, the bonded structure effectively isolates the current collector 64 from the remainder of the cell, in particular from the electrolyte, and this is enhanced by the provision of the coupling sheath 68.

Similarly, the alternate anode portion 62 has a central current collector 84 of metal such as nickel mesh which is connected by a metal conductor 86 to alternate terminal means 36. Preferably, the terminal 36 and conductor 86 can be portions of a single integral wire conductor. An insulator sleeve 88 of suitable material such as Tefzel surrounds conductor 86. A pair of lithium plates or slabs 90 and 92 are provided on opposite sides of current collector 84 in a sandwich-like arrangement. The lithium anode elements 90, 92 are pressure bonded to the current collector 84 in a manner well known to those skilled in the art, this being facilitated by the mesh formation of current collector 84 in a known manner. As a result, contact between the lithium plates and the current collector 84 is maximized by the bonded structure. In addition, the bonded structure effectively isolates current collector 84 from the remainder of the cell, in particular from the electrolyte and this is enhanced by the provision of coupling sheath 88.

The cell according to the present invention further comprises means generally designated 100 for insulating the main 60 and alternate 62 anode portions from each other. In the illustrative embodiment shown the insulating means comprises an elongated band or strip of insulating material interposed between adjacent ends of the main 60 and alternate 62 anode portions. Thus, the main and alternate anode portions are arranged in the assembly in a substantially coplanar and end-to-end relationship with adjacent ends contacting and abutting the insulating strip 100 interposed therebetween. Strip 100 extends along the entire common length of the adjacent ends of the main 60 and alternate 62 anode portions and terminates at one end 102 at the common marginal or peripheral edge defined by the main and alternate anode portions which edge faces the bottom of the casing in an assembled cell. A portion of insulating strip 100 adjacent the opposite end thereof extends along the edge of alternate anode portion 62 to shield it from the header sub-assembly 56. This portion of strip 100 is provided with an opening therethrough to accommodate the conductor terminal pair 36. Insulating strip 100 is of a material which also is compatible with the electrolyte of the cell, for example a fluoropolymer material commercially available under the designation Tefzel. There is also provided an insulating strip 110 between the edges of main anode portion 60 and the header sub-assembly 56. Strip 110 also has an opening therethrough to accommodate the conductor terminal pair 34. Similarly, strip 110 is of a material which also is compatible with the cell electrolyte, such as Tefzel material.

Figure 3:
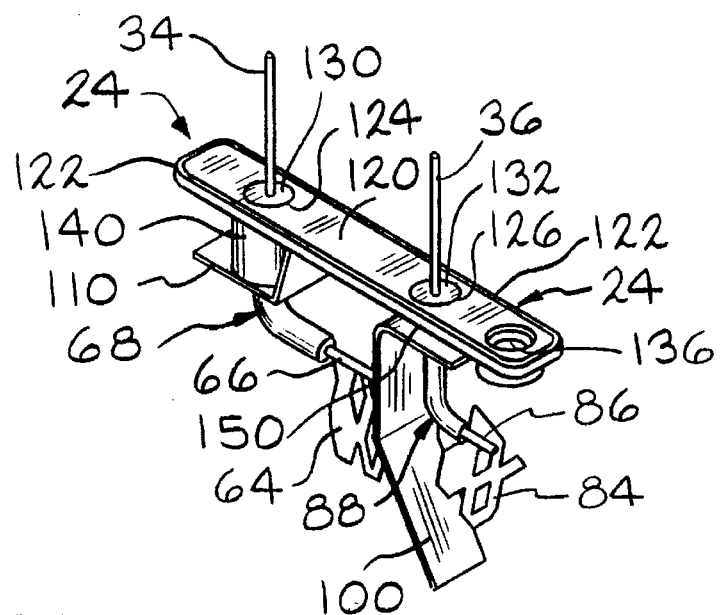
FIG. 3 is a perspective view of the header sub-assembly in the cell of FIG. 1.

The header sub-assembly 56 is shown in FIGS. 2 and 3 and includes the lid component 24 which closes and seals the end of casing 12 in a known manner. Lid 24 includes a planar base portion 120 and a peripheral flange-like rim portion 122 surrounding base 120. A pair of spaced-apart openings 124 and 126 are provided in base 120 through which terminal conductors or pins 34 and 36 extend. Terminal pin 34 is fixed in lid opening 124 by a structure designated 130 and comprising a ferrule fitted in opening 124 and a glass seal which fills the space between terminal conductor 34 and the ferrule. The glass seal serves to insulate terminal 34 electrically from lid 24. Similarly, terminal pin 36 is fixed in lid opening 126 by a structure designated 132 and comprising a ferrule fitting in opening 126 and a glass seal which fills the space between terminal conductor 36 and the ferrule. The glass seal serves to insulate terminal 36 electrically from lid 24. Lid 24 also is provided with a fill opening 136 at one end of base 120 through which liquid electrolyte is introduced during manufacture of the cell as will be described.

A first insulator element 140 is provided for the portion of the terminal conductor 34 which extends between the anode and header sub-assemblies, in particular between anode main portion 60 and lid 24. Insulator 140 is generally cylindrical in shape having a longitudinal passage through which conductor 34 extends and is located with one axial end face contacting insulator strip 110 and having the opposite axial end face contacting the inner surface of base 120. Thus, insulator 140 completely encloses the portion of terminal lead 34 extending between anode main portion 60 and lid 24. Insulator 140 is of suitable material such as Tefzel which is compatible with the cell electrolyte.

Similarly, a second insulator element 150 is provided for the portion of the terminal conductor 36 which extends between the anode and header sub-assemblies, in particular between anode alternate portion 62 and lid 24. Insulator 150 is generally cylindrical in shape having a longitudinal passage through which conductor 36 extends and is located with one axial end face contacting insulator strip 100 and having the opposite axial end face contacting the inner surface of base 120. Thus, insulator 150 completely encloses the portion of terminal lead 36 extending between anode alternate portion 62 and lid 24. Insulator 150 is of suitable material such as Tefzel which is compatible with the cell electrolyte.

Figure 4:
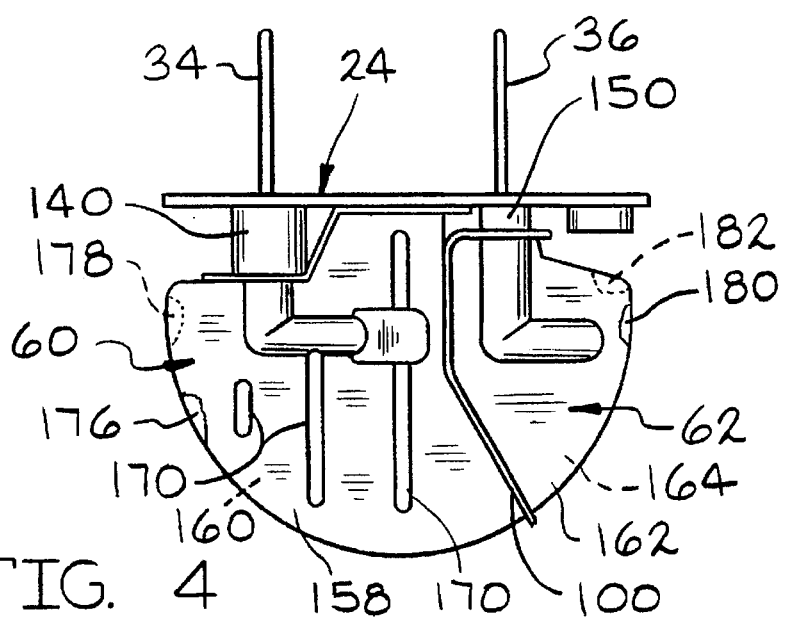
FIG. 4 is a side elevational of the anode and header sub-assemblies in the cell of FIG. 1.
Figure 5:
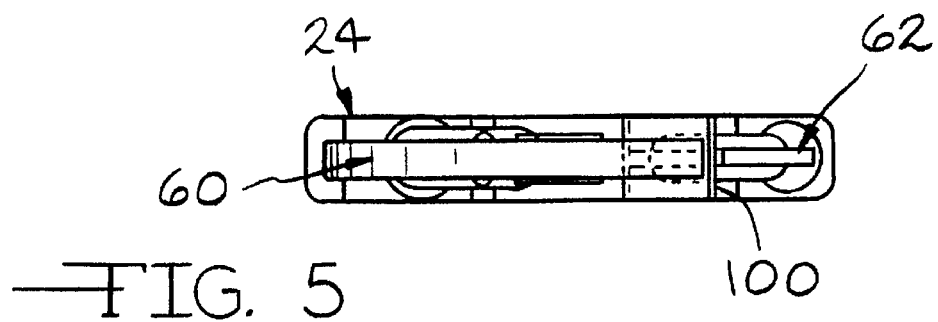
FIG. 5 is a bottom plan view of the assembly of FIG. 4.

FIGS. 2, 4 and 5 show the anode sub-assembly 54 and the header sub-assembly 56 joined together. As previously described, in the illustrated embodiment, the anode is centrally located within the cell casing 12, cathode parts are on opposite sides of the central anode with separators therebetween and liquid electrolyte fills the casing. Thus each anode section 60 and 62 has a pair of outwardly and oppositely directed operative surfaces including the surfaces 158 and 160 of anode main portion 60 and the surfaces 162 and 164 of alternate anode portion 62. All of the anode operative surfaces are in operative contact with the cell liquid electrolyte. As shown in FIGS. 2 and 4, the main anode portion 60 is provided with formations 170 for increasing the surface area of the anode operative surface, the formations 170 preferably being provided on both of the oppositely directed surfaces 158 and 160. Each formation 170 is elongated having terminations at both end thereof, and the terminations are spaced inwardly a short distance from the peripheral edge of the anode portion 60 thereby defining a marginal border region between the peripheral edge and the termination of the formations. The formations 170 are generally mutually parallel, and are also generally parallel to the common longitudinal axes of terminal conductor 34 and insulator 140. The formations 170, which are in the shape of ribs or corrugations, have generally smooth outer surfaces and preferably are generally semi-circular in cross-section. The remaining anode surface portions are generally planar except around insulator 140 and coupling element 68 where they are curved or outwardly bulged. For a more detailed description of formations like ribs 170 and a method of making an anode assembly provided with such formation, reference may be made to U.S. Pat. No. 4,601,962 issued Jul. 22, 1986 entitled "Anode Assembly For Lithium—Halogen Cell" and assigned to the assignee of the present invention, the disclosure of which is hereby incorporated by reference.

In the illustrative cell shown, the operative surfaces of alternate anode portion 62 are not provided with formations for increasing the surface area thereof. However, if desired such formations also can be provided on one or both of the surfaces 162 and 164 of anode portion 62.

In some embodiments of the present invention, for example a cell having a halogen cathode, the operative surfaces of both anode portions 60 and 62 can be provided with coatings of an organic electron donor material to improve the electrically effective contact area between the cathode material and the anode portion. Thus, surfaces 158 and 160 are provided with coatings 176 and 178, respectively. Similarly, surfaces 162 and 164 are provided with coatings 180 and 182, respectively. Only portions of the coatings are shown for convenience. For a more detailed description of such anode coatings, reference may be made to the above-identified U.S. Pat. No. 4,601,962.

As can be seen in the bottom plan view of FIG. 5, not only is anode alternate portion 62 smaller in sideways dimension as compared to anode main portion 60 when viewed in FIGS. 2 and 4, but also alternate portion 62 is thinner than main portion 60. Thus, it is desired to maximize the size of main anode portion 60 which is operative during most of the life of the cell. It is desired to optimize the size of alternate anode position 62 to provide the required longer time interval between the onset of end-of-life and the time when replacement is needed, and at the same time saving material weight and cost by limiting the size of alternate portion 62 to only what is needed to accomplish the objective.

Figure 6:
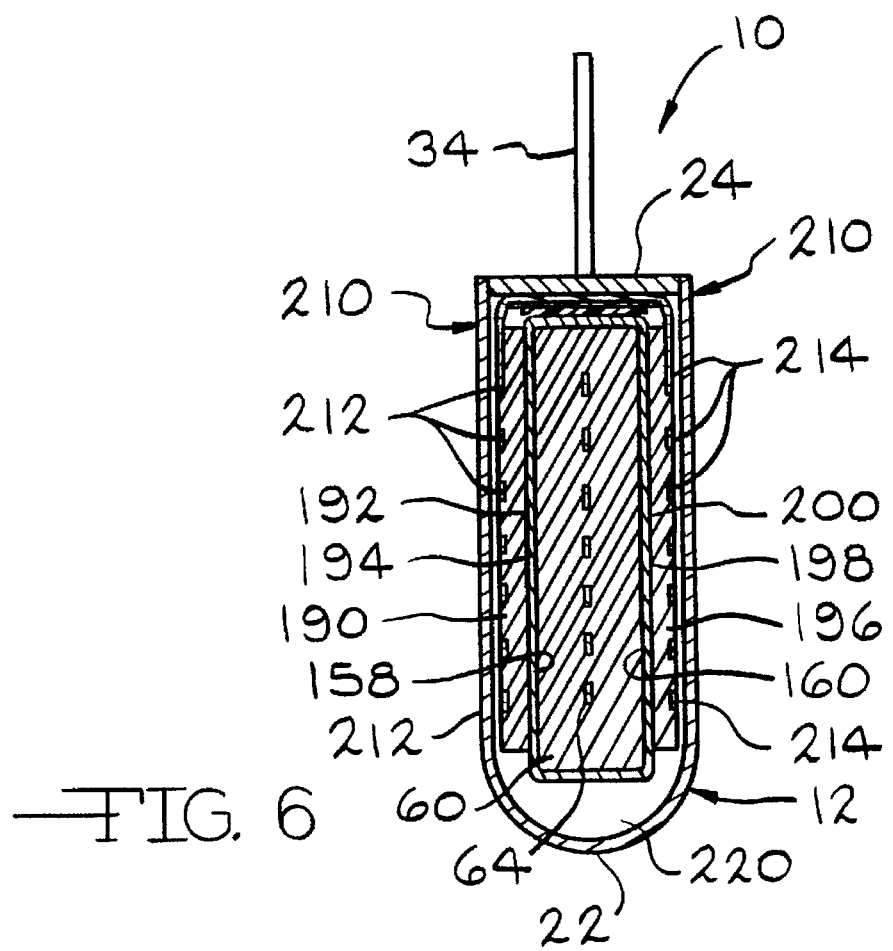
FIG. 6 is a sectional view taken about on line 6—6 in FIG. 1.

The cell according to this embodiment of the present invention is completed by cathode parts on opposite sides of the anode assembly 54, separators therebetween and liquid electrolyte filling the casing 12. As shown in FIG. 6, a first cathode body 190 in the form of a plate or slab of cathode material is operatively associated with one side of the anode assembly 54 comprising the anode main and alternate portions. In particular, the surface 192 of cathode body 190 is adjacent surface 158 of anode main portion 60 and adjacent surface 162 of anode alternate portion 62. Cathode surface 192 is in operative contact with anode surfaces 158 and 162 through a thin sheet of separator material 194. Similarly, a second cathode body 196 in the form Of a plate or slab of cathode material is operatively associated with the other or opposite side of the anode assembly 54 comprising the anode main and alternate portions. In particular, the surface 198 of cathode body 196 is adjacent surface 160 of anode main portion 60 and adjacent surface 164 of anode alternate portion 62. Cathode surface 198 is in operative contact with anode surfaces 160 and 164 through a thin sheet of separator material 200. There is also provided a cathode electrode means generally designated 210 which comprises a unitary body having a pair of wing-like sections 212, 214 joined by a central or intermediate web section 216. The electrode wing sections 212 and 214 are embedded within the cathode body portions 190 and 196, respectively, so as to be in electrical contact therewith. The electrode web section 216 is welded or otherwise joined to the inner surface of lid 24 so as to be in electrical contact therewith. Thus, in the cell of this embodiment of the present invention, the cathode is operatively connected to casing 12 for making electrical connection from a load to the cell by means of the conductive casing. For a more detailed description of an electrode structure similar to electrode means 210, reference may be made to U.S. Pat. No. 5,250,373 issued Oct. 5, 1993 entitled "Internal Electrode And Assembly Method For Electrochemical Cells" and assigned to the assignee of the present invention.

The cell is completed by a liquid electrolyte 220 in casing 12. The liquid electrolyte is introduced to the interior of casing 12 via the fill opening 136 in lid 24. After the required quantity of electrolyte is provided in casing 12, opening 136 is sealed closed by a plug-like element 224 in sealing relationship with opening 136.

The cell of the illustrated embodiment operates in the following manner. When the ionic conductive electrolytic solution becomes operatively associated with the anode and cathode of the cell, an electrical potential difference is developed between terminals operatively connected to the anode and cathode, i.e. between casing 12 and either of the main 34 or alternate 36 terminal means. The electrochemical reaction at the anode includes oxidation to form metal ions during discharge of the cell. The electrochemical reaction of the cathode involves conversion of ions which migrate from the anode to the cathode into atomic or molecular forms.

The load 32 typically is a medical device implanted in a patient, such as a cardiac pacer or a pump or valve in a drug delivery system. Switching means 40 connects main terminal 34 to load 32 during the normal operative life of cell 10 so long as the output voltage remains at its rated or normal expected level. In this connection, switching means 40 includes voltage responsive means so that it maintains the connection of main terminal 34 to load 32 so long as the cell output voltage remains at the rated or normal expected level. When the cell reaches end-of-life with the result that the output voltage steps or transitions to a lower level, this is detected by the voltage responsive means causing switching means 40 to disconnect main terminal 34 from load 32 and to connect alternate terminal 36 to the load 32. As a result, an acceptable level of output voltage is maintained by the cell and applied to the load 32 in a manner advantageously providing a relatively longer time interval between the onset of end-of-life of the cell and the time when replacement is needed. This is of obvious benefit when cell 10 is implanted in a patient for powering an implanted medical device.

The voltage responsive switching means 40 can be of various types and typically is incorporated in the device comprising load 32. By way of example, an illustrative switching means 40 includes the combination of a latching comparator and a switching unit. The main or primary electrode 34 is connected to the latching comparator which monitors the voltage level on this electrode. Both electrodes 34 and 36 are connected to the switching unit which normally connects only the main electrode 34 to load 32. When the voltage level on electrode 34 falls below a predetermined level this is sensed by the latching comparator which then sends a command signal to the switching unit causing it to disconnect electrode 34 from load 32 and to connect the alternate or secondary electrode 36 to load 32. The predetermined voltage level at which the comparator is set is ascertained from the discharge curve of cell 10, is indicative of the onset of end-of-life of the cell, and can be expressed as a percentage of the output voltage level of cell 10 during normal operating life.

By way of example, in the illustrative cell shown, the material of cathode bodies 190 and 196 is a silver vanadium oxide cathode material as described in U.S. Pat. Nos. 4,310,609 issued Jan. 12, 1982 and 4,391,729 issued Jul. 5, 1983, both assigned to the assignee of the present invention, the disclosure of which are hereby incorporated by reference. Separators 194 and 200 are of polypropylene, electrode 210 is of nickel, electrolyte 220 is a 1.0 molar solution of lithium hexafluoroarsenate prepared by dissolving lithium hexafluoroarsenate in equal quantities of DME (GLYME) and propylene carbonate, and terminal pins 34 and 36 are of molybdenum.

In the cell of the embodiment illustrated herein, the anode is formed to have main and alternate portions. The cell of the present invention can have a cathode provided with main and alternate portions, and in that embodiment there preferably would be a cathode assembly centrally located in the casing and anode parts on opposite sides thereof. The cathode main and alternate portions would be insulated from each other and connected to the main and alternate terminals 34 and 36. The anode parts would be joined by an electrode similar to electrode means 210 and connected electrically to the cell casing. By selection of various cell configurations and cell materials, the present invention is applicable to an electrochemical cell including an alkali metal anode, a halogen cathode and a solid electrolyte, to a cell including an alkali metal anode, a solid cathode and a liquid electrolyte and to a cell including an alkali metal anode and a soluble cathode.

It is therefore apparent that the present invention accomplishes its intended objects. While an embodiment of the present invention has been described in detail, that is done for the purpose of illustration, not limitation.

What is claimed is:

1. In an electrochemical cell for use with an implantable medical device and including an alkali metal anode and a cathode within an elongated conductive casing having spaced-apart substantially parallel side walls, one of said anode and cathode being operatively connected to said casing for making electrical connection from a load to the cell, the other of said anode and cathode having main and alternate portions, main terminal means electrically insulated from said casing and operatively connected to said main portion for making electrical connection from a load to the cell, alternate terminal means electrically insulated from said casing and operatively connected to said alternate portion for making electrical connection from a load to the cell, so that the main portion first is discharged with the alternate portion held in reserve whereupon when the main portion reaches end of life the alternate portion is discharged, said main and alternate portions together comprising an elongated body located generally centrally of said casing sidewalls, means for insulating said main and alternate portions from each other, and each of said main and alternate portions having a current collector therein disposed in a plane substantially parallel to said side walls and connected to a corresponding one of said main and alternate terminal means.

2. An electrochemical cell according to claim 1, in combination with switching means connected electrically between a load and said main and alternate terminal means for connecting said main terminal means initially to the load and then disconnecting said main terminal means and connecting said alternate terminal means to the load when the main portion reaches end of life.

3. An electrochemical cell according to claim 1, wherein said anode is of lithium.

4. An electrochemical cell according to claim 1, wherein said anode includes formation for increasing the operative surface area thereof.

5. In an electrochemical cell for use with an implantable medical device and including an alkali metal anode, a halogen cathode and a solid electrolyte within an elongated conductive casing having spaced-apart substantially parallel side walls, means for making electrical connection from a load through said casing to said cathode of said cell, said anode having main and alternate portions, main terminal means electrically insulated from said casing and operatively connected to said main anode portion for making electrical connection from the load to the cell, alternate terminal means electrically insulated from said casing and operatively connected to said alternate anode portion for making electrical connection from the load to the cell, so that the main anode portion first is discharged with the alternate anode portion held in reserve whereupon when the main anode portion reaches end of life the alternate anode portion is discharged, said main and alternate anode portions together comprising an elongated body located generally centrally of said casing sidewalls, means for insulating said main and alternate anode portions from each other, and each of said main and alternate anode portions having a current collector therein disposed in a plane substantially parallel to said sidewalls and connected to a corresponding one of said main and alternate terminal means.

6. An electrochemical cell according to claim 5, in combination with switching means connected electrically between the load and said main and alternate terminal means for connecting said main terminal means initially to the load and then disconnecting said main terminal means from the load and connecting said alternate terminal means to the load when the main anode portion reaches end of life.

7. An electrochemical cell according to claim 5, wherein said anode is of lithium.

8. An electrochemical cell according to claim 5, wherein said anode includes formations for increasing the operative surface area thereof.

9. An electrochemical cell according to claim 5, wherein said anode portions have operative surfaces provided with a coating thereon of an organic electron donor material.

10. In an electrochemical cell for use with an implantable medical device and including an alkali metal anode, a solid cathode and a liquid electrolyte within an elongated conductive casing having spaced-apart substantially parallel side walls, means for making electrical connection from a load through said casing to said cathode of said cell, said anode having main and alternate portions, main terminal means electrically insulated from said casing and operatively connected to said main anode portion for making electrical connection from the load to the cell, alternate terminal means electrically insulated from said casing and operatively connected to said alternate anode portion for making electrical connection from the load to the cell, so that the main anode portion first is discharged with the alternate anode portion held in reserve whereupon when the main anode portion reaches end of life the alternate anode portion is discharged, said main and alternate anode portions together comprising an elongated body located generally centrally of said casing sidewalls, means for insulating said main and alternate anode portions from each other, and each of said main and alternate anode portions having a current collector therein disposed in a plane substantially parallel to said sidewalls and connected to a corresponding one of said main and alternate terminal means.

11. An electrochemical cell according to claim 10, in combination with switching means connected electrically between the load and said main and alternate terminal means for connecting said main terminal means initially to the load and then disconnecting said main terminal means from the load and connecting said alternate terminal means to the load when the main anode portion reaches end of life.

12. An electrochemical cell according to claim 10, wherein said anode is of lithium.

13. An electrochemical cell according to claim 10, wherein said anode includes formations for increasing the operative surface area thereof.

14. In an electrochemical cell for use with an implantable medical device and including an alkali metal anode, a solid cathode and a liquid electrolyte within an elongated conductive casing having spaced-apart substantially parallel side walls, means for making electrical connection from a load through said casing to said anode of said cell, said cathode having main and alternate portions, main terminal means electrically insulated from said casing and operatively connected to said main cathode portion for making electrical connection from the load to the cell, alternate terminal means electrically insulated from said casing and operatively connected to said alternate cathode portion for making electrical connection from the load to the cell, so that the main cathode portion first is discharged with the alternate cathode portion held in reserve whereupon when the main cathode portion reaches end of life the alternate cathode portion is discharged, said main and alternate cathode portions together comprising an elongated body located generally centrally of said casing side walls, means for insulating said main and alternate cathode portions from each other, and each of said main and alternate cathode portions having a current collector therein disposed in a plane substantially parallel to said side walls and connected to a corresponding one of said main and alternate terminal means.

15. An electrochemical cell according to claim 14, in combination with switching means connected electrically between the load and said main and alternate terminal means for connecting said main terminal means initially to the load and then disconnecting said main terminal means from the load and connecting said alternate terminal means to the load when the main cathode portion reaches end of life.

16. An electrochemical cell according to claim 14, wherein said anode is of lithium.

17. In an electrochemical cell for use with an implantable medical device and including an alkali metal anode, a soluble cathode and a cathode element, within an elongated conductive casing having spaced-apart substantially parallel side walls, means for making electrical connection from a load through said casing to said cathode element of said cell, said anode having main and alternate portions, main terminal means electrically insulated from said casing and operatively connected to said main cathode portion for making electrical connection from the load to the cell, alternate terminal means electrically insulated from said casing and operatively connected to said alternate cathode portion for making electrical connection from the load to the cell, so that the main anode portion first is discharged with the alternate anode portion held in reserve whereupon when the main anode portion reaches end of life the alternate anode portion is discharged, said main and alternate anode portions together comprising an elongated body located generally centrally of said casing side walls, means for insulating said main and alternate anode portions from each other, and each of said main and alternate anode portions having a current collector therein disposed in a plane substantially parallel to said side walls and connected to a corresponding one of said main and alternate terminal means.

18. An electrochemical cell according to claim 17, in combination with switching means connected electrically between the load and said main and alternate terminal means for connecting said main terminal means initially to the load and then disconnecting said main terminal means from the load and connecting said alternate terminal means to the load when the main anode portion reaches end of life.

19. An electrochemical cell according to claim 17, wherein said anode is of lithium.

20. An electrochemical cell according to claim 17, wherein said anode includes formations for increasing the operative surface areas thereof.

21. In an electrochemical cell for use with an implantable medical device and including an alkali metal anode, a soluble cathode and a cathode element within an elongated conductive casing having spaced-apart substantially parallel side walls, means for making electrical connection from a load through said casing to said anode, said cathode element having main and alternate portions, main terminal means electrically insulated from said casing and operatively connected to said main cathode element portion for making electrical connection from the load to the cell, alternate terminal means electrically insulated from said casing and operatively connected to said alternate cathode element portion for making electrical connection from the load to the cell, so that the main cathode element portion first is discharged with the alternate cathode element portion held in reserve whereupon when the main cathode element portion reaches end of life the alternate cathode element portion is discharged, said main and alternate cathode element portions together comprising an elongated body located generally centrally at said casing side walls, means for insulating said main and alternate cathode element portions from each other, and each of said main and alternate cathode element portions being disposed in a plane substantially parallel to said side walls.

22. An electrochemical cell according to claim 21, in combination with switching means connected electrically between the load and said main and alternate terminal means for connecting said main terminal means initially to the load and then disconnecting said main terminal means from the load and connecting said alternate terminal means to the load when the main cathode element portion reaches end of life.

23. An electrochemical cell according to claim 21, wherein said anode is of lithium.

24. In combination:

a) an electrochemical cell for use with an implantable medical device and including an alkali metal anode and a cathode within an elongated conductive casing having spaced-apart substantially parallel side walls, one of said anode and cathode being operatively connected to said casing for making electrical connection to the cell, the other of said anode and cathode having main and alternate portions, main terminal means electrically insulated from said casing and operatively connected to said main portion for making electrical connection to the cell, alternate terminal means electrically insulated from said casing and operatively connected to said alternate portion for making electrical connection to the cell;

b) switching means connected electrically between a load and said main and alternate terminal means for connecting said main terminal means initially to the load and then disconnecting said main terminal means and connecting said alternate terminal means to the load when the main portion reaches end of life, said switching means operating in response to a change in an electrical parameter indicating that the main portion has reached end of life; and b) so that the main portion first is discharged with the alternate portion held in reserve whereupon the main portion reaches end of life the alternate portion is discharged, said main and alternate portions together comprising an elongated body located generally centrally of said casing side walls, means for insulating said main and alternate portions from each other, and each of said main and alternate portions having a current collector therein disposed in a plane substantially parallel to said sidewalls and connected to a corresponding one of said main and alternate terminal means.

25. The combination according to claim 24, wherein said switching means includes voltage responsive means for sensing when said main portion reaches end of life.

* * * * *